US011380304B1

(12) United States Patent
Ponnusamy et al.

(10) Patent No.: US 11,380,304 B1
(45) Date of Patent: Jul. 5, 2022

(54) GENERATION OF ALTERNATE REPRESENTIONS OF UTTERANCES

(71) Applicant: Amazon Technologies, Inc., Seattle, WA (US)

(72) Inventors: Pragaash Ponnusamy, Seattle, WA (US); Alireza Roshan Ghias, Seattle, WA (US); Chenlei Guo, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 163 days.

(21) Appl. No.: 16/363,880

(22) Filed: Mar. 25, 2019

(51) Int. Cl.
| | |
|---|---|
| *G06F 40/00* | (2020.01) |
| *G10L 15/18* | (2013.01) |
| *G10L 15/06* | (2013.01) |
| *G10L 15/26* | (2006.01) |
| *G06F 40/35* | (2020.01) |
| *G10L 15/19* | (2013.01) |
| *G10L 15/22* | (2006.01) |
| *G10L 15/183* | (2013.01) |
| *G06F 40/30* | (2020.01) |

(52) U.S. Cl.
CPC ........ *G10L 15/063* (2013.01); *G10L 15/1822* (2013.01); *G10L 15/26* (2013.01); *G06F 40/30* (2020.01); *G06F 40/35* (2020.01); *G10L 15/18* (2013.01); *G10L 15/183* (2013.01); *G10L 15/1815* (2013.01); *G10L 15/19* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 9,922,642 B2* | 3/2018 | Pitschel | ................ | G10L 15/063 |
| 10,621,499 B1* | 4/2020 | Khamis | ................ | G06N 5/003 |
| 2006/0074631 A1* | 4/2006 | Wang | ................ | G06F 40/20 |
| | | | | 704/9 |
| 2007/0129936 A1* | 6/2007 | Wang | ................ | G06F 40/30 |
| | | | | 704/9 |
| 2014/0136186 A1* | 5/2014 | Adami | ............... | H04N 21/8541 |
| | | | | 704/9 |
| 2014/0324429 A1* | 10/2014 | Weilhammer | ...... | G10L 15/1815 |
| | | | | 704/244 |
| 2015/0032443 A1* | 1/2015 | Karov | .................... | G06F 16/36 |
| | | | | 704/9 |
| 2015/0039292 A1* | 2/2015 | Suleman | ............... | G06F 16/285 |
| | | | | 704/9 |

(Continued)

OTHER PUBLICATIONS

Fouss, F.; Faulkner, S.; Kolp, M.; Pirotte, A.; and Saerens, M. 2005. Web recommendation system based on a markov-chain model. Proceedings of the Seventh International Conference on Enterprise Information Systems 56-63.

(Continued)

*Primary Examiner* — Richard Z Zhu
(74) *Attorney, Agent, or Firm* — Pierce Atwood LLP

(57) ABSTRACT

A system is provided for handling errors during automatic speech recognition by processing a potentially defective utterance to determine an alternative, potentially successful utterance. The system processes an ASR hypothesis, using a probabilistic graph, to determine a likelihood that it will result in an error. Using the probabilistic graph, the system determines an alternate utterance.

20 Claims, 12 Drawing Sheets

(56) References Cited

U.S. PATENT DOCUMENTS

| | | | | |
|---|---|---|---|---|
| 2015/0227845 A1* | 8/2015 | Hakkani-Tur | ........... | G06F 40/30 706/52 |
| 2015/0370787 A1* | 12/2015 | Akbacak | ................ | G06F 40/44 704/2 |
| 2017/0193585 A1* | 7/2017 | Guo | .................... | G06F 16/9535 |
| 2019/0103092 A1* | 4/2019 | Rusak | .................. | G06N 3/0454 |
| 2021/0089531 A1* | 3/2021 | Hu | ........................ | G06F 16/248 |

OTHER PUBLICATIONS

Gao, J.; Galley, M.; and Li, L. 2018. Neural approaches to conversational AI. CoRR abs/1809.08267.

Grinstead, C. M., and Snell, J. L. 1997. Introduction to Probability. American Mathematical Society.

Jansen, B. J.; Booth, D. L.; and Spink, A. 2005. Patterns of query reformulation during web searching. Journal of the American Society for Information Science and Technology 60(7):1358-1371.

Khorasani, E. S.; Zhenge, Z.; and Champaign, J. 2016. A markov chain collaborative filtering model for course enrollment recommendations IEEE International Conference on Big Data.

Sahoo, N.; Singh, P. V.; and Mukhopadhyay, T. 2012. A hidden markov model for collaborative filtering. MIS Quarterly.

Sarikaya, R. 2017. The technology behind personal digital assistants: An overview of the system architecture and key components. IEEE Signal Processing Magazine 34(1):67-81.

Wang, J.; Huang, J. Z.; and Wu, D. 2015. Recommending high utility queries via query-reformulating graph. Mathematical Problems in Engineering.

Xiaofei Zhu, Jiangfeng Guo, X. C. Y. L. 2012. More than relevance: High utility query recommendation by mining users' search behaviors CIKM'12, Oct. 29-Nov. 2, Maui, HI, USA.

Zaharia, M.; Xin, R. S.; Wendell, P.; Das, T.; Armbrust, M.; Dave, A.; Meng, X.; Rosen, J.; Venkataraman, S.; Franklin, M. J.; Ghodsi, A.; Gonzalez, J.; Shenker, S.; and Stoica, I. 2016. Apache spark: A unified engine for big data processing. Commun. ACM 59(11):56-65.

Y. He, J. Tang, H. Ouyang, C. Kang, D. Yin, and Y. Chang, "Learning to rewrite queries," in Proceedings of the 25th ACM International on Conference on Information and Knowledge Management, pp. 1443-1452, 2016.

S. Riezler, Y. Liu, "Query rewriting using monolingual statistical machine translation," Computational Linguistics, vol. 36, No. 3, pp. 569-582, 2010.

J. Wang, J. Z. Huang, D. Wu, "Recommending High Utility Queries via Query-Reformulation Graph", Mathematical Problems in Engineering, vol. 2015, Article ID 956468, 14 pages, 2015.

* cited by examiner

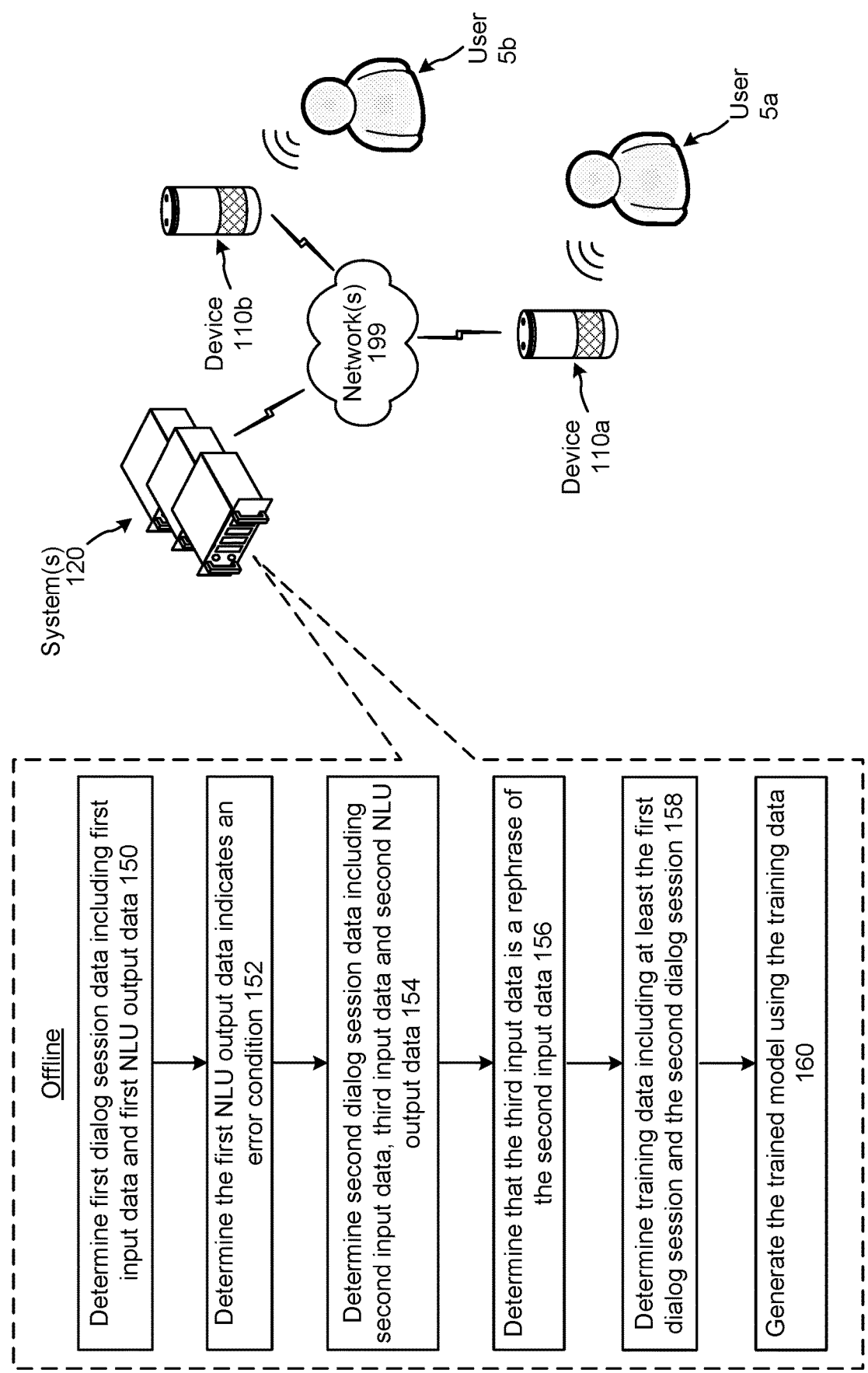

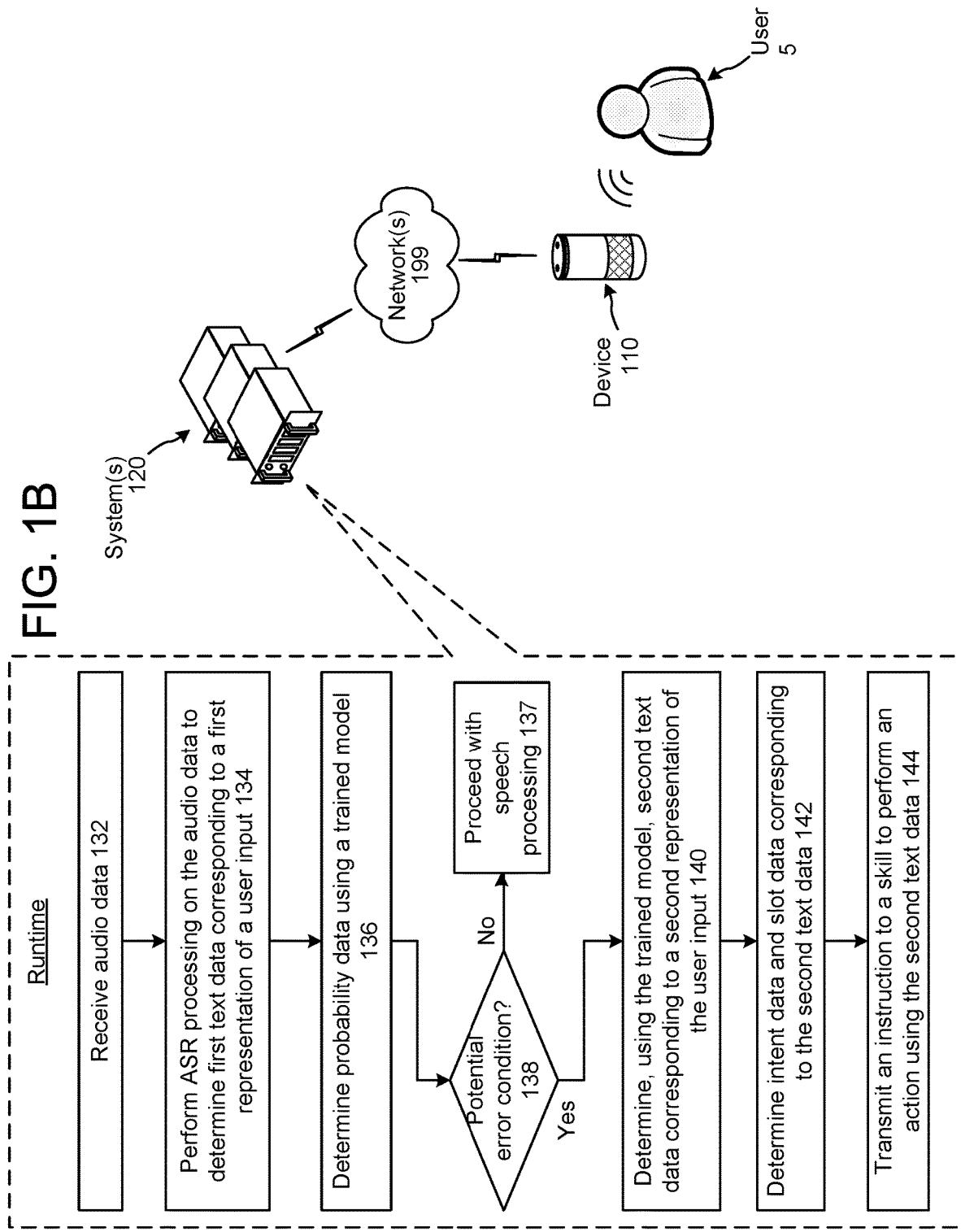

GENERATION OF ALTERNATE REPRESENTIONS OF UTTERANCES

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to use user input data to generate a trained model according to embodiments of the present disclosure.

FIG. 1B illustrates a system configured to determine a likelihood of success for a user input using the trained model and provide an alternate utterance according to embodiments of the present disclosure.

DETAILED DESCRIPTION

Figure 2:
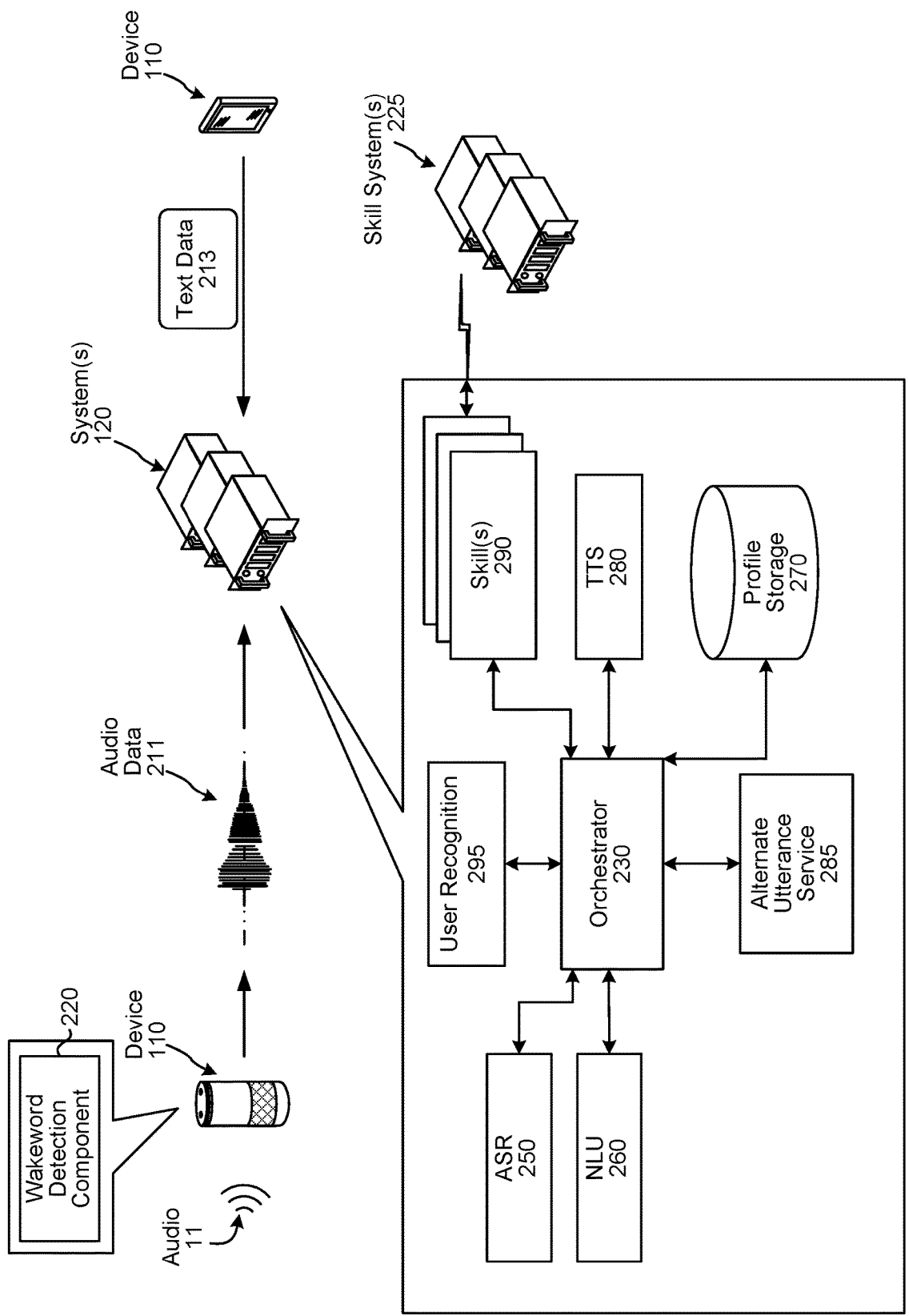
FIG. 2 is a conceptual diagram of components of a system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

A system may receive a user input as speech. For example, a user may speak an input to a device. The device may send audio data, representing the spoken input, to the system. The system may perform ASR processing on the audio data to generate text data representing the user input. The system may perform NLU processing on the text data to determine an intent of the user input as well as portions of the text data that may be used to perform an action responsive to the user input.

One potential failure point for a speech processing system occurs when an error in ASR processing propagates into downstream components such as the NLU, resulting in further errors. For example, a spoken input of "open YouTube" may be misrecognized during ASR processing as "open you too," and NLU may be unable to interpret/perform the user's desired action (e.g., resolving to "open U2"). Another potential failure point may be if a user inputs a command phrasing that the system is not configured to recognize. For example, NLU may understand "what's the weather in Seattle", but may not comprehend "is it going to rain in Seattle tomorrow." Users may experience such errors as defects and may need to repeat or rephrase their queries to facilitate system understanding. Such rephrase pairs—e.g., a failed attempt with one phrasing and a subsequent success with a later phrasing having the same intent—may be leveraged by the system described herein to improve system performance in handling later user inputs. For example, the system may use utterance rephrasings to generate a probabilistic graph that can be used to select an alternate utterance/alternate phrasing of a future input utterance. The system may also use the probabilistic graph to determine if an input utterance is likely to lead to an error or otherwise may result in an outcome that results in an undesired user experience. If so, the system may select an alternate phrasing of the utterance that may be passed to downstream processing components (e.g., NLU components) which may ultimately be more likely than the original utterance phrasing to produce the output intended by the user.

When interacting with the system, a user may experience an improved interaction when the system is able to respond even when the system may encounter certain ASR or NLU processing errors or other misunderstanding/misinterpretation of what the user said. The present disclosure improves ASR by learning from a mapping of defective utterances to successful utterances based on past user interactions and proactively applying the learned mappings during run-time to rewrite an utterance that would have failed or resulted in an error. In exemplary embodiments, the system receives text data representing a user input, and determines, using a trained model, if the text data is likely to cause an error during NLU processing. If the text data will cause an error, the system determines alternate text data representing the user input, using the trained model, where the alternate text data is known to be successfully processed by the NLU component.

The present system may provide a more desirable user experience. This is due, at least in part, to the fact that the present disclosure's teachings decrease a frequency at which unresponsive actions are performed by a system. By decreasing the instances of such actions being performed, user/system interactions may be improved.

FIG. 1A illustrates a system configured to process user input data to generate the trained model according to embodiments of the present disclosure. Although the figures and discussion herein illustrate certain operational steps of the system in a particular order, the steps described may be performed in a different order (as well as certain steps removed or added) without departing from the intent of the disclosure. As illustrated in FIG. 1A, the system may include multiple devices 110a, 110b local to respective users 5a, 5b, in communication with one or more systems 120 across one or more networks 199. The operations illustrated in FIG. 1A may be performed during offline operations.

The dialog session data may include text data representing a user input/utterance, a corresponding NLU hypothesis, and an indication of whether the NLU processing of the user input was successful. The indication may be stored as "error" or "success." Alternatively, the indication may be a numerical value 0 (indicating error) or 1 (indicating success). The dialog session data may also include text data representing subsequent user inputs/utterances, data representing the system's response to the user input/utterance, and the like.

The system(s) 120 determines (150) first dialog session data representing a first dialog session between a first user (e.g., user 5a) and a first device (e.g., device 110a). The first dialog session may include first input data and first NLU output data. The first input data may be a first utterance spoken by the first user and may be processed by the NLU component 260 to generate NLU output data. The system(s) 120 determines (152) that the first NLU output data indicated an error condition.

The system(s) 120 determines (154) second dialog session data representing a second dialog session between a second user (e.g., user 5b) and a second device (e.g., device 110b). The second dialog session data may include second input data, third input data and second NLU output data. The third input data may be received after the second input data. The system(s) 120 determines (156) that the third input data is a rephrase of the second input data based on receiving the input data from the same user profile and/or user device. The system(s) 120 may also determine that the third input data is a rephrase of the second input data based on the third input data being received within a particular timeframe (e.g., 45 seconds) of the second input data. The second input data may have resulted in an error condition, and the user may have provided a rephrased input. The third input data may be processed by the NLU component 260 to generate the second NLU output data. The second NLU output data may indicate successful processing of the third input data, and may include intent data and slot data corresponding to the third input data.

The system(s) 120 determines (158) training data including at least the first dialog session data and the second dialog session data. The system(s) 120 may include the first and second dialog session data in the training data based on the first input data for the first dialog session and the second/third input data for the second dialog session having the same intent. The system(s) 120 may determine the intent for the user inputs using their corresponding NLU hypotheses. The system(s) 120 generates (156) the trained model using the training data. In an example embodiment, the trained model is a probabilistic graph, in particular, a Markov Chain.

In some cases, a user may provide a subsequent user input when the system outputs an error. Often the subsequent user input may be a reformulation or rephrase of the initial user input, so the user can achieve a desired intent. The system described herein leverages such interactions by encoding initial user input data and subsequent user input data as stateful representations in a probabilistic graphical model. The probabilistic graph model, for example a Markov Chain model, may model a sequence of possible events in which the probability of each event depends on the state attained in the previous event. The system is able to identify connections toward a shared intent, and allows to re-route possibly defective user input interpretation paths toward states with a higher likelihood of satisfactory user experience.

FIG. 1B illustrates a system configured to determine a likelihood of success for a user input using a trained model and provide an alternate utterance according to embodiments of the present disclosure. Although the figures and discussion herein illustrate certain operational steps of the system in a particular order, the steps described may be performed in a different order (as well as certain steps removed or added) without departing from the intent of the disclosure. As illustrated in FIG. 1B, the system may include device 110 local to a user 5, in communication with one or more systems 120 across one or more networks 199. The operations illustrated in FIG. 1B may be performed during runtime operations.

The system(s) 120 receives (132) audio data. The audio data may include a user input/utterance spoken by the user 5 and captured by the device 110. The system(s) 120 performs (134) automatic speech recognition (ASR) using the audio data to determine first text data corresponding to a first representation of the user input. The first text data may be an ASR hypothesis corresponding to the user input. ASR may be performed on the audio data as described in detail below. One of the outputs or results of ASR is language model output data that may include one or more ASR hypotheses (an N-best list) for the user input. The system(s) 120 may determine the first text data based on the best ASR hypothesis (selected based on its corresponding score).

The system(s) 120 determines (136) probability data using a trained model, where the probability data indicates a likelihood/probability of the first text data resulting in an error during downstream (e.g., NLU) processing. The system(s) 120 may determine that the first text data corresponds to a previous user input that is represented in the trained model. The probability data may be determined based at least in part on the outcome/result of NLU processing of the previous user input. The trained model may be determined or generated according to the operations described in connection to FIG. 1A. In an example embodiment, the trained model is a probabilistic graph, and the probability data is determined by traversing the graph using the first text data as the starting node. The probability data may be based on the weights of the edges of the traversal path. The probability data may be based on a value of an intermediate node or end node of the traversal path. In other embodiments, the probability data may be based on aggregating the weights of the traversal path from an initial node to an end node. This process is described in further detail below in connection with FIGS. 6 and 7.

The system(s) 120 determines (138) a potential error condition when the probability data is below a threshold. If the system(s) 120 determines that there are no potential error conditions in the ASR processing, then the system(s) 120 proceeds with speech processing (137) as described in connection with FIG. 2A. A potential error condition may occur during further speech processing, for example, during NLU processing or skill processing, or when the output presented to the user is not responsive to the user input (as indicated by subsequent user input or by the user abandoning the dialog session/interaction with the device).

The system(s) 120 determines (140), using the trained model, second text data representing a second/alternative representation of the user input. The second text data may be determined in response to step 138. In an example embodiment, the trained model maps previous interactions between multiple users and devices, and includes an indication on whether a user input caused a processing error or not. A processing error, as used herein, may include an error during NLU processing, TTS processing, skills processing, or other processing performed by the system(s) 120. In some cases, the trained model includes an alternate user input/utterance for the user input that causes a processing error. The alternate user input/utterance may be a rephrase of the initial user input, and may be known/mapped (from previous interactions) in the trained model as being successfully processed by the NLU component.

The system(s) 120 determines (142) intent data and slot data corresponding to the second text data. In an example embodiment, the system(s) 120 may determine the intent and slot data by processing the second text data using NLU processing. In an alternative embodiment, the system(s) 120 may bypass NLU processing and may determine the intent and slot data by retrieving it from stored data corresponding to the trained model. In some embodiments, the stored data corresponding to the trained model may include intent data and slot data corresponding to alternate utterance/user inputs. The intent data and slot data may be determined as described in detail with respect to NLU component 260 below. The alternate utterance/user input is previously processed by the NLU component 260 successfully, and the corresponding intent and slot data may be stored.

The system(s) 120 sends (144) an instruction to a skill to perform an action using the second text data, the intent data and/or the slot data. The system(s) 120 may determine the skill based on the intent corresponding to the second text data and the skill being capable of performing an action associated with the intent.

The system(s) 120 may determine a success condition based on the probability data being above a threshold. The success condition indicates that the first text data corresponding to the user input will likely results in successful NLU processing. In response to the success condition, the system(s) 120 may send the first text data to the NLU component 260 for processing and to determine intent data and slot data associated with the first text data. The system(s) 120 may determine a skill associated with the intent data and send an instruction to the skill to perform an action using the first text data, the intent data and/or the slot data.

In another embodiment, the system(s) 120 may send the first text data directly to a corresponding skill based on the success condition being determined, rather than performing NLU processing to determine the intent and slot data. The intent and slot data corresponding to the first text data may be determined based on data retrieved from a data source. The data source may store data corresponding to the trained model, including data indicating an intent and slot data corresponding to particular successful user inputs/utterances.

In this manner, the system(s) 120 uses a trained model to determine if text data representing a user input will result in an error or successful NLU processing. If the system(s) 120 determines that the text data will result in a potential error, the system(s) 120 determines, using the trained model, alternate text data representing the user input. The system(s) 120 may send the alternate text data to a skill for performing an action. If the text data is determined to result in successful NLU processing, then the system(s) 120 may send the text data directly to an appropriate skill for performing an action, or the system(s) 120 may send the text data to NLU processing to determine an intent and slot data.

Potential NLU processing errors may include ambiguous entity data, slot recognition/classification errors, intent recognition/classification errors, skill processing errors, user errors (e.g., when a user provides a user input in an incorrect manner or syntax, a user input includes a slip of tongue, mispronunciation, etc.), a null-response (e.g., the NLU component being unable to find a response to the user's intent), and the like.

The system may operate using various components as illustrated in FIG. 2. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110 may send text data 213 to the server(s) 120. Upon receipt by the server(s) 120, the text data 213 may be sent to the orchestrator component 230, which may send the text data 213 to the NLU component 260.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The ASR engine 258 may return an N-best list of paths along with their respective recognition scores, corresponding to the top N paths as determined by the ASR engine 258. An application (such as a program or component either internal or external to the ASR component 250, e.g., the alternate utterance service 285) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

Figure 3:
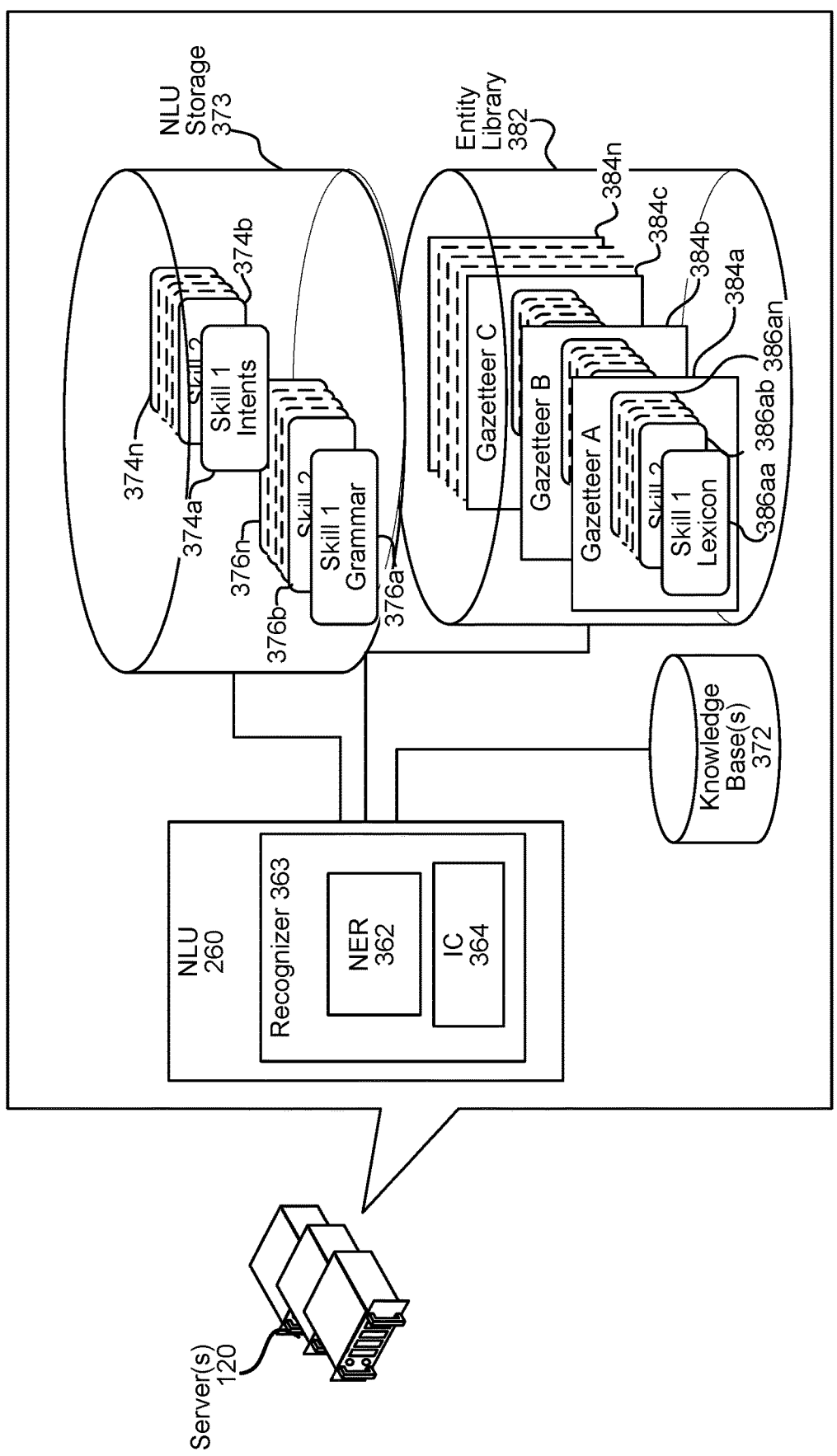
FIG. 3 is a conceptual diagram illustrating how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, skill server(s) 225, etc.) to complete that action.

The NLU component 260 may process text data including several ASR hypotheses. The NLU component 260 may process all (or a portion of) the ASR hypotheses input therein. Even though the ASR component 250 may output multiple ASR hypotheses, the NLU component 260 may be configured to only process with respect to the top scoring ASR hypothesis.

The NLU component 260 may include one or more recognizers 363. Each recognizer 363 may be associated with a different skill 290. Each recognizer 363 may process with respect to text data input to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a skill 290. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular user and/or device 110. For example, a Gazetteer A (384a) includes skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, etc.).

Each grammar model 376 includes the names of entities (i.e., nouns) commonly found in speech about the particular skill 290 to which the grammar model 376 relates, whereas the lexical information 386 is personalized to the user and/or the device 110 from which the user input originated. For example, a grammar model 376 associated with a shopping skill may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374.

The intents identifiable by a specific IC component 364 are linked to skill-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {skill} Music, {intent}<PlayMusic>, {artist name} rolling stones, {media type} SONG, and {song title} mother's little helper. For further example, the NER component 362 may tag "play songs by the rolling stones" as: {skill} Music, {intent}<PlayMusic>, {artist name} rolling stones, and {media type} SONG.

Figure 4:
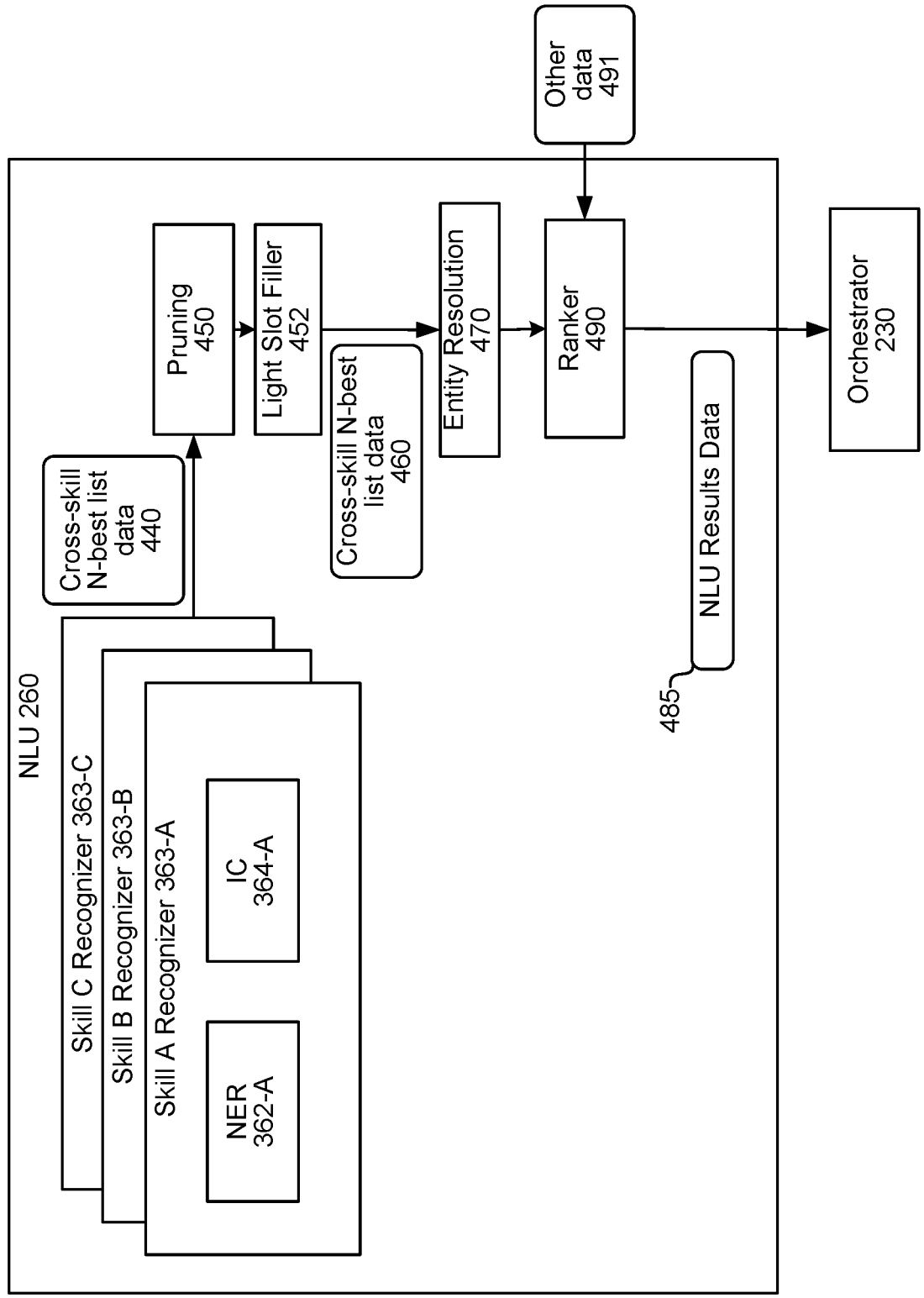
FIG. 4 is a conceptual diagram illustrating how natural language understanding processing is performed according to embodiments of the present disclosure.

The NLU component 260 may generate cross-skill N-best list data 440, which may include a list of NLU hypotheses output by each recognizer 363 (as illustrated in FIG. 4). A recognizer 363 may output tagged text data generated by an NER component 362 and an IC component 364 operated by the recognizer 363, as described above. Each NLU hypothesis including an intent indicator and text/slots may be grouped as an NLU hypothesis represented in the cross-skill N-best list data 440. Each NLU hypothesis may also be associated with one or more respective score(s) for the NLU hypothesis. For example, the cross-skill N-best list data 440 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-skill N-best list data 440 to a pruning component 450. The pruning component 450 may sort the NLU hypotheses represented in the cross-skill N-best list data 440 according to their respective scores. The pruning component 450 may then perform score thresholding with respect to the cross-skill N-best list data 440. For example, the pruning component 450 may select NLU hypotheses represented in the cross-skill N-best list data 440 associated with confidence scores satisfying (e.g., meeting and/or exceeding) a threshold confidence score. The pruning component 450 may also or alternatively perform number of NLU hypothesis thresholding. For example, the pruning component 450 may select a maximum threshold number of top scoring NLU hypotheses. The pruning component 450 may generate cross-skill N-best list data 460 including the selected NLU hypotheses. The purpose of the pruning component 450 is to create a reduced list of NLU hypotheses so that downstream, more resource intensive, processes may only operate on the NLU hypotheses that most likely represent the user's intent.

The NLU component 260 may also include a light slot filler component 452. The light slot filler component 452 can take text data from slots represented in the NLU hypotheses output by the pruning component 450 and alter it to make the text data more easily processed by downstream components. The light slot filler component 452 may perform low latency operations that do not involve heavy operations, such as those requiring reference to a knowledge base. The purpose of the light slot filler component 452 is to replace words with other words or values that may be more easily understood by downstream system components. For example, if an NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-skill N-best list data 460.

The NLU component 260 sends the cross-skill N-best list data 460 to an entity resolution component 470. The entity resolution component 470 can apply rules or other instructions to standardize labels or tokens from previous stages into an intent/slot representation. The precise transformation may depend on the skill 290. For example, for a travel skill, the entity resolution component 470 may transform text data corresponding to "Boston airport" to the standard BOS three-letter code referring to the airport. The entity resolution component 470 can refer to a knowledge base that is used to specifically identify the precise entity referred to in each slot of each NLU hypothesis represented in the cross-skill N-best list data 460. Specific intent/slot combinations may also be tied to a particular source, which may then be used to resolve the text data. In the example "play songs by the stones," the entity resolution component 470 may reference a personal music catalog, Amazon Music account, user profile data, or the like. The entity resolution component 470 may output text data including an altered N-best list that is based on the cross-skill N-best list data 460, and that includes more detailed information (e.g., entity IDs) about the specific entities mentioned in the slots and/or more detailed slot data that can eventually be used by downstream components to perform an action responsive to the user input. The NLU component 260 may include multiple entity resolution components 470 and each entity resolution component 470 may be specific to one or more skills 290.

The entity resolution component 270 may not be successful in resolving every entity and filling every slot represented in the cross-skill N-best list data 460. This may result in the entity resolution component 470 outputting incomplete results.

The NLU component 260 may include a ranker component 490. The ranker component 490 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the entity resolution component 470.

The ranker component 490 may apply re-scoring, biasing, and/or other techniques to determine the top scoring NLU hypotheses. To do so, the ranker component 490 may consider not only the data output by the entity resolution component 470, but may also consider other data 491. The other data 491 may include a variety of information. The other data 491 may include skill 490 rating or popularity data. For example, if one skill 290 has a particularly high rating, the ranker component 490 may increase the score of an NLU hypothesis associated with that skill 290, and vice versa. The other data 491 may include information about skills 290 that have been enabled for the user identifier and/or device identifier associated with the current user input. For example, the ranker component 490 may assign higher scores to NLU hypotheses associated with enabled skills 290 than NLU hypotheses associated with non-enabled skills 290. The other data 491 may include data indicating user usage history, such as if the user identifier associated with the current user input is regularly associated with user inputs that invoke a particular skill 290 or does so at particular times of day. The other data 491 may include data indicating date, time, location, weather, type of device 110, user identifier, device identifier, context, as well as other information. For example, the ranker component 490 may consider when any particular skill 290 is currently active (e.g., music being played, a game being played, etc.) with respect to the user or device 110 associated with the current user input. The other data 491 may include device type information. For example, if the device 110 does not include a display, the ranker component 490 may decrease the score associated with an NLU hypothesis that would result in displayable content being presented to a user, and vice versa.

Following ranking by the ranker component 490, the NLU component 260 may output NLU results data 485 to the orchestrator component 230. The NLU results data 485 may include the top scoring NLU hypotheses as determined by the ranker component 490. Alternatively, the NLU results data 485 may include the top scoring NLU hypothesis as determined by the ranker component 490.

The orchestrator component 230 may select a skill 290, based on the NLU results data 485, for performing an action responsive to the user input. In an example, the orchestrator component 230 may send all (or a portion of) the NLU results data 485 to a skill 290 that is represented in the NLU results data 485 and to be invoked to perform an action responsive to the user input.

The system(s) 120 may also include an alternate utterance service component 285. The alternate utterance service component 285 may be included in the ASR component 250 or the NLU component 260. The alternate utterance service component 285 may receive text data/ASR hypothesis representing a user input, and determine, using a trained model, if the text data is likely to cause an error during NLU processing. If the text data will cause an error, the alternate utterance service component 285 determines, using the trained model, alternate text data representing the user input, where the alternate text data is known to be successfully processed by the NLU component.

Figure 5:
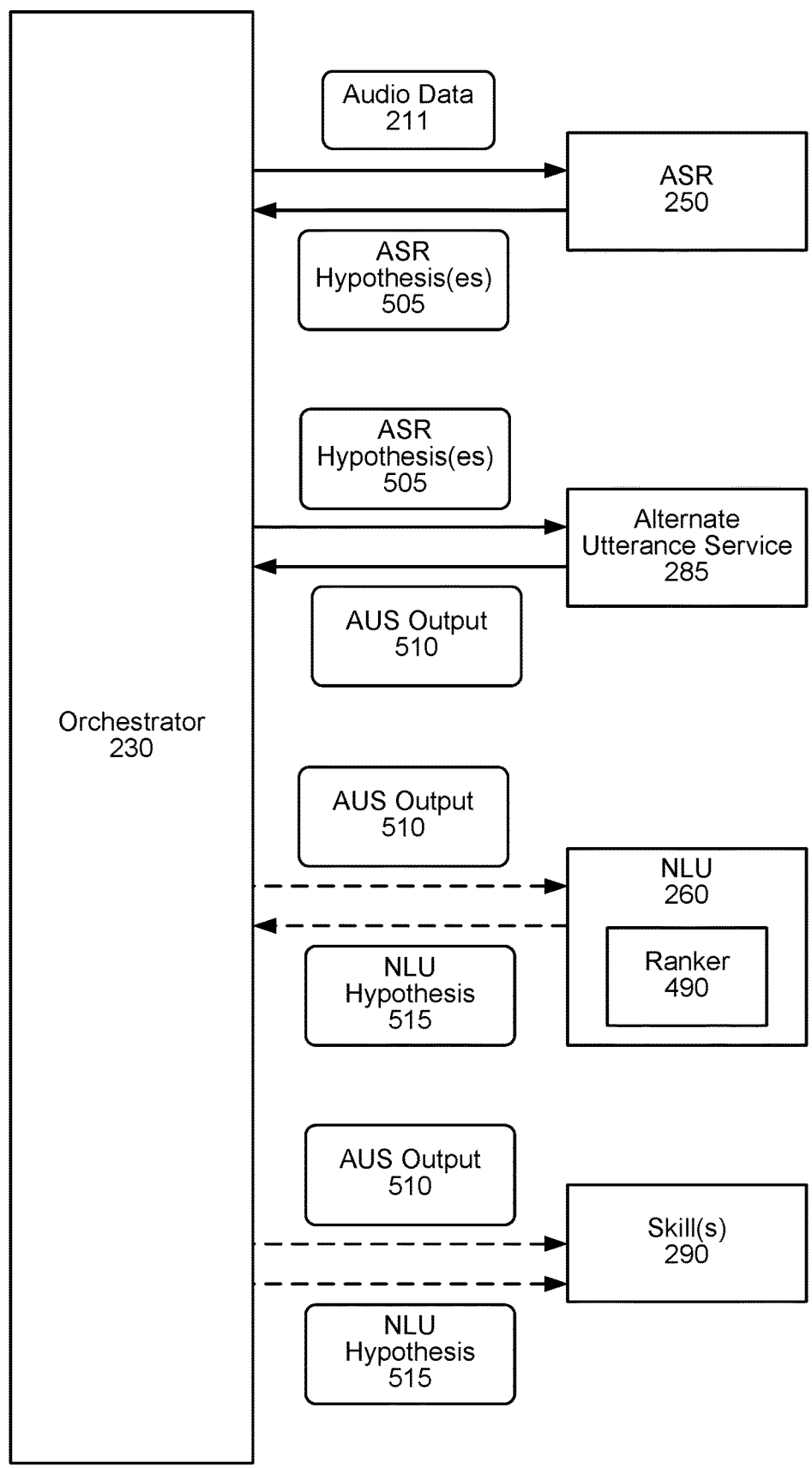
FIG. 5 is a conceptual diagram illustrating how user inputs may be processed at runtime using an alternate utterance service according to embodiments of the present disclosure.

FIG. 5 conceptually illustrates how user inputs may be processed during runtime using the alternate utterance service component 285 according to embodiments of the present disclosure. If a user input is received as audio 11 (e.g., is a spoken user input), the orchestrator component 230 may send audio data 211, representing the audio 11, to the ASR component 250. The ASR component 250 may transcribe the audio data 211 into an ASR hypothesis(es) 505, which the ASR component 250 may send to the orchestrator component 230.

The orchestrator component 230 may send the ASR hypothesis(es) 505 to the alternate utterance service 285. The alternate utterance service 285 may process the ASR hypothesis(es) 505 to determine whether one or more of the ASR hypothesis(es) 505 should be rephrased.

The alternate utterance service 285 may implement a trained model (generated by the model building component 710) to determine whether the present user input should be rephrased. For example, the alternate utterance service 285 may process an ASR hypothesis to determine whether the ASR hypothesis is similar to previous user inputs that were rephrased or resulted in an error (e.g., an NLU processing error, a skill processing error, a generated output being unresponsive to the user input, etc.).

The alternate utterance service 285 generates alternate utterance service (AUS) output data 510. The AUS output data 510 may be text data representing an alternate representation (an alternate ASR hypothesis) of the user input represented by ASR hypothesis 505. The alternate utterance service 285 may output an alternate representation of the user input if it is determined, using the trained model, that the ASR hypothesis 505 will cause an error during further processing. The alternate utterance service 285 may output multiple alternate representations of the user input and the AUS output data 510, thus, may include text data corresponding to multiple alternate representations (e.g., first text data corresponding to a first alternate representation, second text data corresponding to a second alternate representation, etc.).

The AUS output data 510 may be text data representing one or more of the ASR hypotheses 505. The alternate utterance service 285 may output one or more ASR hypotheses 505 as the AUS output data 510 if it is determined, using the trained model, that one or more ASR hypotheses 505 will not cause an error during further processing.

In some embodiments, the AUS output data 510 may also include intent data and/or slot data corresponding to the text data (the alternate text or the ASR hypothesis text). In such an embodiment the AUS output data 510 may be in the form of NLU output data rather than ASR output data. Alternatively, the orchestrator 230 may send the AUS output data/NLU output data 510 to one or more skill(s) 290 for processing and executing a corresponding action.

In some embodiments, the orchestrator 230 may send the AUS output data 510 (in the form of an ASR hypothesis/ alternate ASR output data) to the NLU component 260 to determine the corresponding intent data and corresponding slot data. The AUS output data 510 may include multiple ASR hypotheses or alternate representations of the user input, and the NLU component 260 may process each one (as described in relation to FIGS. 3 and 4) to determine a N-best list of NLU hypotheses. The NLU hypotheses may be processed by the ranker component 490 (described above in connection with FIG. 4) to determine a NLU hypothesis 515 that best represents the intent and slot data corresponding to the user input represented in audio data 211. The orchestrator 230 may send the NLU hypothesis 515 to an appropriate skill(s) 290 for processing and executing a corresponding action.

In some embodiments, the AUS output data 510 may include one or more of the ASR hypotheses 505 generated by the ASR component 250 and one or more alternate representations/ASR hypotheses determined by the trained model implemented by the alternate utterance service 285. The NLU component 260 may process the original ASR hypothesis(es) and the alternate ASR hypothesis(es) to determine a N-best list of NLU hypotheses, and select one NLU hypothesis for further processing. Thus, the NLU component 260 may select the best NLU output data for further processing based on comparing NLU output data corresponding to the original ASR output data and the alternate ASR output data. In this manner, the system(s) 120 is configured to consider the original ASR output data and the alternate ASR output data during NLU processing, rather than just considering the alternate ASR output data.

The alternate utterance service 285 may implement one or more trained models (generated by the model building component 710) to generate alternate text data representing the user input.

In some embodiments, the alternate utterance service 285 may consider personalized context information for a user (associated with the user input) when determining an alternate text representing for the user input. For example, the alternate utterance service 285 may consider dialog session data, device information, user profile data and the like.

When a user input is received by a device 110, the device 110 may generate a user input identifier corresponding to the user input. The system may maintain a record of processing performed with respect to the user input using the user input identifier. For example, the audio data 211 may be associated with the user input identifier when the orchestrator component 230 sends the audio data 211 to the ASR component 250; the ASR hypothesis 505 may be associated with the user input identifier when the ASR component 250 sends the ASR hypothesis 505 to the orchestrator component 230; the ASR hypothesis 505 may be associated with the user input identifier when the orchestrator component 230 sends the ASR hypothesis 505 to the alternate utterance service 285; the AUS output data 510 may be associated with the user input identifier when the alternate utterance service 285 sends the AUS output data 510 to the orchestrator component 230; the AUS output data 510 may be associated with the user input identifier when the orchestrator component 230 sends the AUS output data 510 to the NLU component 260; the AUS output data 510 may be associated with the user input identifier when the orchestrator component 230 sends the AUS output data 510 to the skill(s) 290; etc.

As described above, the alternate utterance service 285 may receive an ASR hypothesis 505 when the user input is a spoken user input. One skilled in the art will appreciate that the alternate utterance service 285 may receive text data (representing a text based user input) and may process as described above with the text based user input without departing from the present disclosure.

Figure 6:
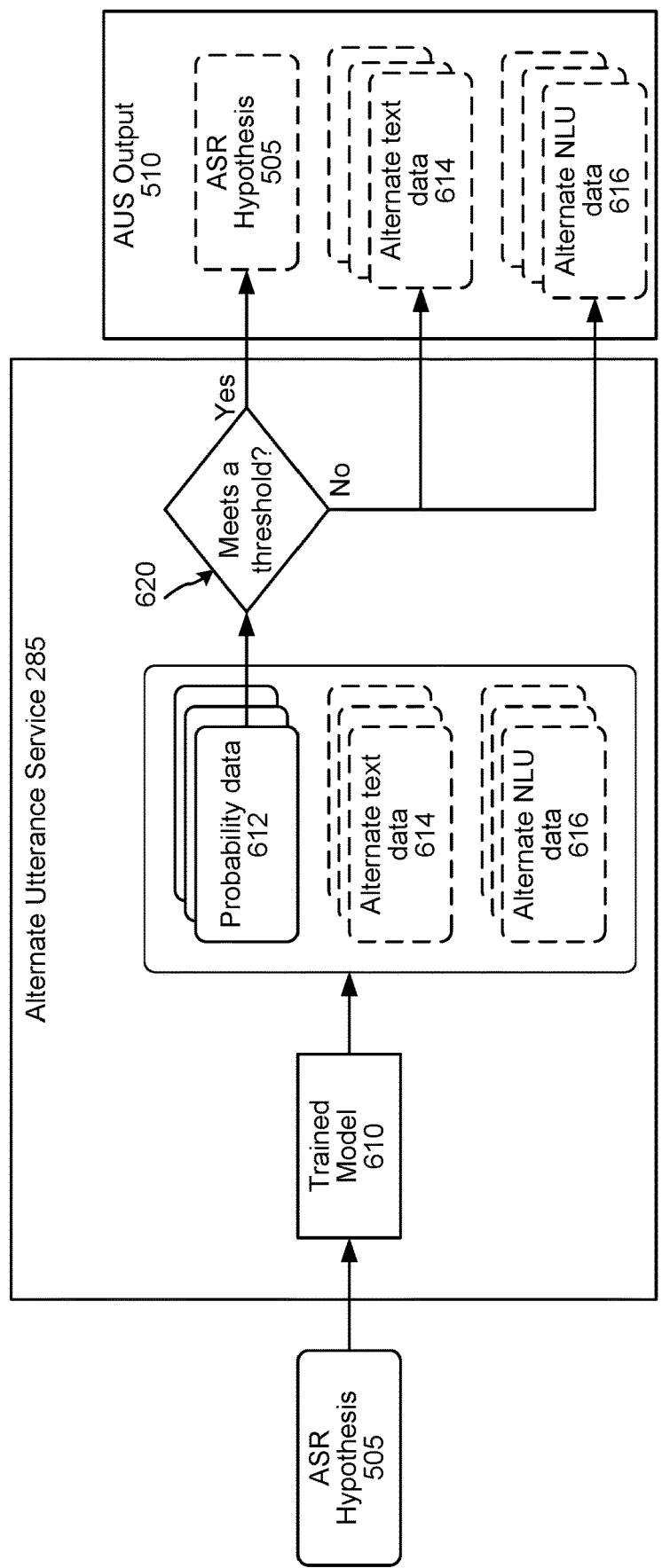
FIG. 6 is a conceptual diagram of alternate utterance service components according to embodiments of the present disclosure.

FIG. 6 is a conceptual diagram of the alternate utterance service components according to embodiments of the present disclosure. The alternate utterance service component 285 includes a trained model 610. The trained model 610 may be generated as described in connection with FIG. 7. The alternate utterance service component 285 receives an ASR hypothesis 505 from the orchestrator 230 or from the ASR component 250. The ASR hypothesis 505 is text data representing a user input/utterance. The trained model 610 processes the ASR hypothesis 505 to output probability data 612. The probability data 612 may indicate a probability/likelihood of the ASR hypothesis 505 resulting in an error during further processing of the user input by the system(s) 120.

In an example embodiment, the trained model 610 is a probabilistic graph, for example, a Markov Chain, having multiple nodes. Each node may represent a unique NLU interpretation including a respective domain, a respective intent and respective slot data. The probability data 612 is determined by traversing the graph, using the ASR hypothesis 505 to determine the starting/initial node, and traversing till an end node is reached. The end node may represent the alternate text data 614 if the end node is indicated as a success condition. A node is connected to one or more nodes using edges. The probability data 612 may be based on the weights of the edges of the traversal path. The probability data may be based on a value of an intermediate node or an end node of the traversal path. In other embodiments, the probability data may be based on aggregating the weights of edges in the traversal path from an initial node to an end node. In some cases, the traversal path may end at the initial node, indicating that the ASR hypothesis results in successful processing. In some cases, the end node may be indicated as an error condition, in which case the trained model 610 is unable to provide alternate text data that will result in successful processing.

In some cases, the trained model 610 may also output alternate text data 614. The alternate text data 614 may be an alternate representation of the user input represented by the ASR hypothesis 505. In some cases, the trained model 610 may output alternate NLU data 616. The alternate NLU data 616 may include an intent and slot data corresponding to the alternate text data 614. The trained model 610 may output the alternate text data 614 and/or the alternate NLU data 616 only when available for the particular user input.

The trained model 610 may traverse multiple paths starting with the initial node representing the ASR hypothesis 505 and ending at multiple end nodes. For example, the trained model 610 may traverse a first path starting at the initial node and ending at a first end node having first probability data/score 612a and/or corresponding alternate text data 614b/alternate NLU data 616b. The trained model 610 may traverse a second path starting at the initial node and ending at a second end node having second probability data/score 612b and/or corresponding alternate text data 614b/alternate NLU data 616b. In some embodiments, the alternate utterance service 285 may output alternate text data 614a and 614b and/or alternate NLU data 616a and 616b based on them indicating a success condition during further processing. The alternate text data 614a may correspond to a first domain that is different than a second domain corresponding to the alternate text data 614b. Thus, the alternate utterance service 285 may output alternate text data/ASR hypotheses that correspond to different domains.

In some embodiments, the alternate utterance service 285 may process multiple ASR hypotheses using the trained model 610 to determine a likelihood of one or more the ASR hypotheses generating an error condition during further processing.

The alternate utterance service component 285 generates the AUS output data 510. The alternate utterance service component 285 determines (620) if the probability data 612 meets a threshold. If the probability data 612 meets the threshold indicating that the ASR hypothesis 505 is likely to be successfully processed by the NLU component, then the alternate utterance service component 285 outputs the ASR hypothesis 505 as the AUS output data 510. If the probability data 612 does not meet the threshold indicating that the ASR hypothesis 505 is likely to result in an error during further processing, then the alternate utterance service component 285 stores the alternate text data 614 and/or the alternate NLU data 616 as the AUS output data 510.

In the case where the AUS output data 510 includes multiple alternate text data 614, the NLU component 260 may process the multiple alternate text data 614 to generate a N-best list of NLU hypotheses and, using ranker component 490, select the best NLU hypothesis that represents the intent and slot data corresponding to the user input.

In some cases, a user may provide a subsequent user input when the system outputs an error. Often the subsequent user input may be a reformulation or rephrase of the initial user input, so the user can achieve a desired intent. The system described herein leverages such interactions by encoding initial user input data and subsequent user input data as stateful representations in a probabilistic graphical model. The probabilistic graph model, for example a Markov Chain model, may model a sequence of possible events in which the probability of each event depends on the state attained in the previous event. The system is able to identify connections toward a shared intent, and allows to re-route possibly defective user input interpretation paths toward states with a higher likelihood of satisfactory user experience.

Figure 7:
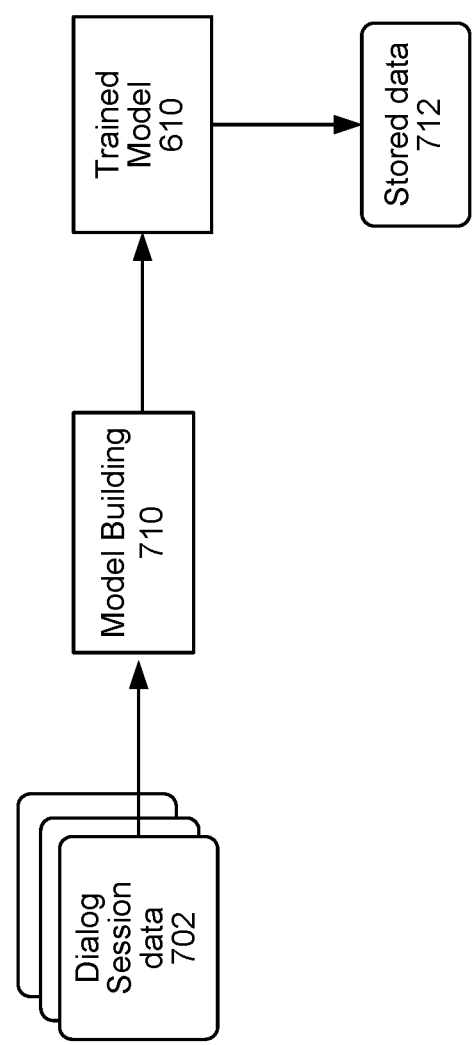
FIG. 7 is a conceptual diagram of building the trained model using training data according to embodiments of the present disclosure.

FIG. 7 conceptually illustrates components for training a machine learning model to determine if a user input will result in an error and provide an alternate utterance for the user input. The alternate utterance service 285 may include a model building component 710. The model building component 710 may be a separate component included in the system(s) 120.

The model building component 710 may train one or more machine learning models to determine if a user input will result in an error and when a user input should be rephrased. The model building component 710 may train the one or more machine learning models during offline operations. The model building component 710 may train the one or more machine learning models using a training dataset.

In an example embodiment, the machine learning model is a stochastic model or a probabilistic graph, for example, a Markov chain. The stochastic model or probabilistic graph may model a sequence of possible events in which the probability of each event depends on the state attained in the previous event.

The machine learning model may be trained to output, for a given user input, a value/probability representing a likelihood that the user input will result in an error (for example, NLU processing error). The value may be a scalar value from, for example, 1 to 5 (e.g., comprising the integers 1, 2, 3, 4, and 5). In another example, the value may be a number between 0 and 1.

The machine learning model may also be trained to output an alternate utterance/text data if the user input is likely to result in an error, where the alternate utterance/text data is known to result in successful processing. The alternate utterance/text data may be related to the same intent as the user input and comprise the same slot data as the user input.

The training dataset used by the model building component 710 may include dialog session data 702 corresponding to user interactions with the device 110. As used herein, a "dialog session" may refer to a set of user inputs and corresponding system outputs while a user interacts with a device 110. When the system(s) 120 receives a user input, the system(s) 120 may associate the data (e.g., audio data or text data) representing the user input with a session identifier. The session identifier may be associated with various speech processing data (e.g., an intent indicator(s), a category of skill to be invoked in response to the user input, etc.). The output or action performed by the system(s) 120 in response to the user input may also be associated with the session identifier and be identified as part of the particular dialog session. The system(s) 120 may receive one or more additional/subsequent user inputs, after the system generates an output or performs an action in response to the initial user input. The additional user inputs may be identified as being part of the same dialog session and associated with the session identifier. The system(s) 120 may determine the additional user inputs are part of the same dialog session based on the time elapsed between the initial user input and the additional user input. In other embodiments, the system(s) 120 may determine the additional user inputs are part of the same dialog session based on the intent and/or slot data of the additional user inputs being the same or similar to the intent and/or slot data of the initial user input. For example, an initial user input of "play maj and dragons" may be associated with a first session identifier. The system(s) 120 may process the user input and determine an error during NLU processing, resulting in a system-generated audio output of "I am sorry, I do not understand" that is associated with the first session identifier. The system(s) may subsequently receive the user input "play Imagine Dragons," which is associated with the first session identifier based on the system(s) 120 receiving it within a predefined time period of the initial user input. The training dataset may include, for example, the initial user input and the subsequent user input. The training dataset may also include an indication if a particular user input or a particular dialog session resulted in an error (e.g., NLU processing error). Thus, the training dataset may include historical data representing user-device interactions and/or NLU processing results corresponding to past or historical user interactions.

The training dataset may be partitioned based on shared intent and slot data. That is, data for dialog sessions corresponding to similar intent and slot data may be grouped together for training the machine learning model. For example, a first dialog session between a first user and a device 110 may have the user input "play maj and dragons," where the intent (as determined by the NLU component 260) may be "PlayMusic" and slot data may be "maj and dragons." A second dialog session between a second user and a device 110 may have the user input "can you play maj and dragons?" where the intent may be "PlayMusic" and slot data may be "maj and dragons." The data for the first and second dialog sessions may be grouped for training purposes.

Figure 8A:
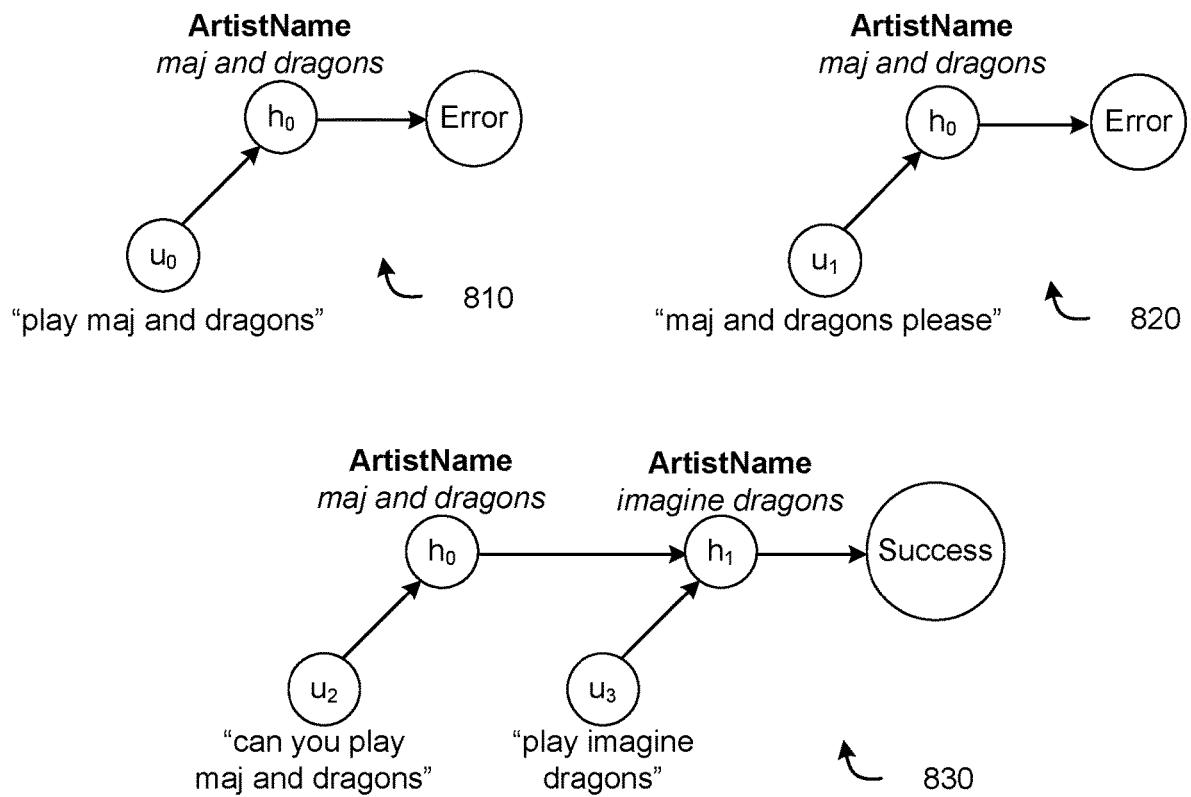
FIG. 8A conceptually illustrates representations of user-device interactions according to embodiments of the present disclosure.
Figure 8B:
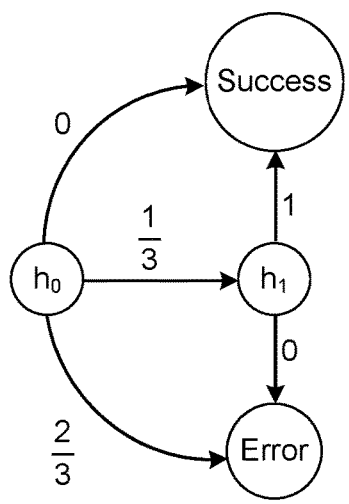
FIG. 8B conceptually illustrates a probabilistic graph derived from user-device interactions according to embodiments of the present disclosure.

FIGS. 8A and 8B illustrates processing of exemplary training data to generate the probabilistic graph. An utterance may be a user input spoken by a user and captured by a device 110. As described above, the utterance may be processed by the ASR component 250 to generate text data, and the NLU component 260 may process the text data to generate intent and/or slot data. The NLU component 260 may output one or more hypotheses for the intent and slot data corresponding to the text data. For explanation and illustrations purposes, an utterance is denoted as u and the corresponding NLU hypothesis is denoted as h below and in FIG. 8.

To generate the probabilistic graph, U and H are defined to be the utterance and hypothesis spaces respectively where the H space is the structured representation of the U space by means of both domain and intent classification, as well as entity recognition (e.g., the result of NLU processing). Consequently, users' interaction patterns are encoded in the H space in lieu of the U space.

Given such an encoding, the end-to-end task of mapping utterances u→u' is refactored and decomposed into three independent discriminative stochastic processes, as follows:

$$P(u'|u) = \Sigma_h \Sigma_{h'} P(h|u) P(h'|h) P(u'|h) \qquad \text{Equation 1}$$

The probabilistic graph is trained to link user-device interaction states across multiple users and devices. For example, consider the three interactions (810, 820, 830) illustrated in FIG. 8A. These interactions may be associated with different users. The interactions 810, 820, 830 have a shared goal to play music by the artist/band called Imagine Dragons.

As shown, all three user interactions experience a similar case of speech recognition error, where the initial user input/utterance is interpreted by the system(s) 120 as the artist, "maj and dragons," which results in an error since the system(s) 120 is unable to find music by the artist "maj and dragons." The system(s) 120 may generate an output, for example, stating "I'm sorry I can't find the artist maj and dragons." The users associated with 810 and 820 may choose to abandon their interaction with the device, while the user associated with 830 may provide a subsequent user input reformulating their query such that the system(s) 120 successfully interpreted the artist as Imagine Dragons, and thus leading to a successful or satisfactory user experience. The model building component 710 may link the interaction states 810, 820 and 830 by taking the union of the three sub-graphs. The result, as shown in FIG. 8B is the hypothesis, $h_0$, has a 2 in 3 chance of being defective and a 1 in 3 chance of transitioning to $h_1$, which in turn creates a path to a successful user experience for $h_0$ through $h_1$. This leads to the formation of an Absorbing Markov Chain as illustrated in FIG. 8B. Solving the illustrated Markov Chain is an extension of identifying its stationary distribution, where in this particular case, is to obtain the probability of being absorbed by the success state given a source transient state $h_0$ and a target transient state h' such that there exists a direct edge (h'→success) in the graph.

Considering the above, $P_0$ is defined as the set composed of paths to node success from node $h_0$. That is, the set of all ordered sequences, $p_k=(h_0, \ldots, h_k, \text{success})$ where $(h_i, h_i+1)$ is an edge in the graph for all 0≤i≤k. Then, the resolved hypothesis, h' of $h_0$ is given by the following formulation:

$$h'=\text{argmax}_{h_k}\{P(\text{success}|h_k)\Sigma_{p=p_k}(\Pi_{i=1}^{k}P(h_i|h_{i-1}))\}\forall p \in \hat{P}_0 \quad \text{Equation 2}$$

Applying equation 2 to the Markov Chain illustrated in FIG. 8B yields that $P_0$ comprises of two distinct paths ($h_0$, success) and ($h_0$, $h_1$, success) with absorption probabilities of 0 and 1/3 respectively, and thus resulting in $h_1$ being the resolved hypothesis of $h_0$. This indicates that resolving $h_0$ to $h_1$ can lead to a higher likelihood of improved user experience than not doing so. This results in the utterances $u_0$, $u_1$, and $u_2$ illustrated in FIG. 8A to map to $h_0 \rightarrow h_1 \rightarrow u_3$ (where $u_3$ is "play imagine dragons"). In this manner, the probabilistic graph/machine learning model trained by the model building component 710 is trained to determine an alternate utterance for an input utterance. For example during runtime, the trained model outputs the alternate utterance "play imagine dragons" for the input utterances "play maj and dragons," "maj and dragons please," and "can you play maj and dragons."

The model building component 710 is configured to extend the aforementioned formulation across larger utterance U and hypothesis H state spaces to map hypotheses in H to that in the resolved state space H', generate the Markov Chain at a distributed scale, and thereafter compute the resolution path sets $P_h$ for all $h \in H$. Since Markov Chains are represented as directed graphs, each of these path sets may be computed by means of a distributed breadth-first search traversal algorithm given h as the source vertex.

In an example embodiment, a distributed graph processing engine may be used to traverse the probabilistic graph to determine the resolution paths. The probabilistic graph may be stored in a data structure. The probabilistic graph may be represented in a relational database, where the edges of the graph and their corresponding properties (e.g., weights) may be stored.

The model building component 710 may transform the training data representing dialog session data by considering each dialog session as a linear sequence of interaction states from which sequential edges can be extracted. A representation of vertices/nodes in the hypothesis space H may be defined as domain, intent, entity name, entity value, etc. After transformation, the vertex pairs may be globally aggregated by the source vertex in the respective pairs as a distributed adjacency map to yield the counts of each unique edge, which are then normalized as probabilities before being flattened down to construct the edge table.

Given the relational abstraction of the probabilistic graph, the traversal and construction of any path on the graph may be viewed as the concatenation of ordered sequential edges of the respective path, and may translate to a series of left-outer self-joins of the aforementioned edge table. With each subsequent join, the destination vertices v of the edges e=(u, v) are connected to their immediate neighbors, resulting in an added depth of the traversal. A complete realization of the graph is required to build complete resolution path sets for every hypothesis in H, which can consume lot of computing resources, and with each join, the gains are marginal. The depth of graph is based on the willingness of users to persist reformulating in the event of dissatisfaction and more often than not, these reformulations are limited as users abandon an interaction or arrive at a successful experience. As such, many of the chains in the graph may be shallow, thus allowing for the imposition of a maximum depth in the traversals. Imposing a maximum depth when traversing the graph lowers the cost of the joins, and also greedily constructs the resolution path sets for every hypothesis. The model building component 710 may also employ an optimization mechanism, where edges and the paths leading to a failure/error absorbing state are repeatedly filtered out at each successive join since only paths to a success state are of interest. In another embodiment, the model building component 710 may also prune/filter out paths with vanishing probabilities (e.g., where the end-to-end probabilities are lower than a specified threshold) during traversal.

In some embodiments, the system(s) 120 traverses the trained model 610, after training, to determine all possible traversal paths between all initial nodes and end nodes. Data 712 corresponding to each traversal path may be stored. Stored data 712 may be in the form of a table or database, where each entry corresponds to a unique traversal path. The stored data 712 includes the respective probability data 612 for each traversal path. The stored data 712 may also include, if available, the respective alternate text data 614 and/or respective alternate NLU data 616 corresponding to each traversal path. During runtime operations, the system(s) 120 may determine probability data and/or the alternate text data for a ASR hypothesis using the stored data 712 rather than traversing the trained model/graph 610.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
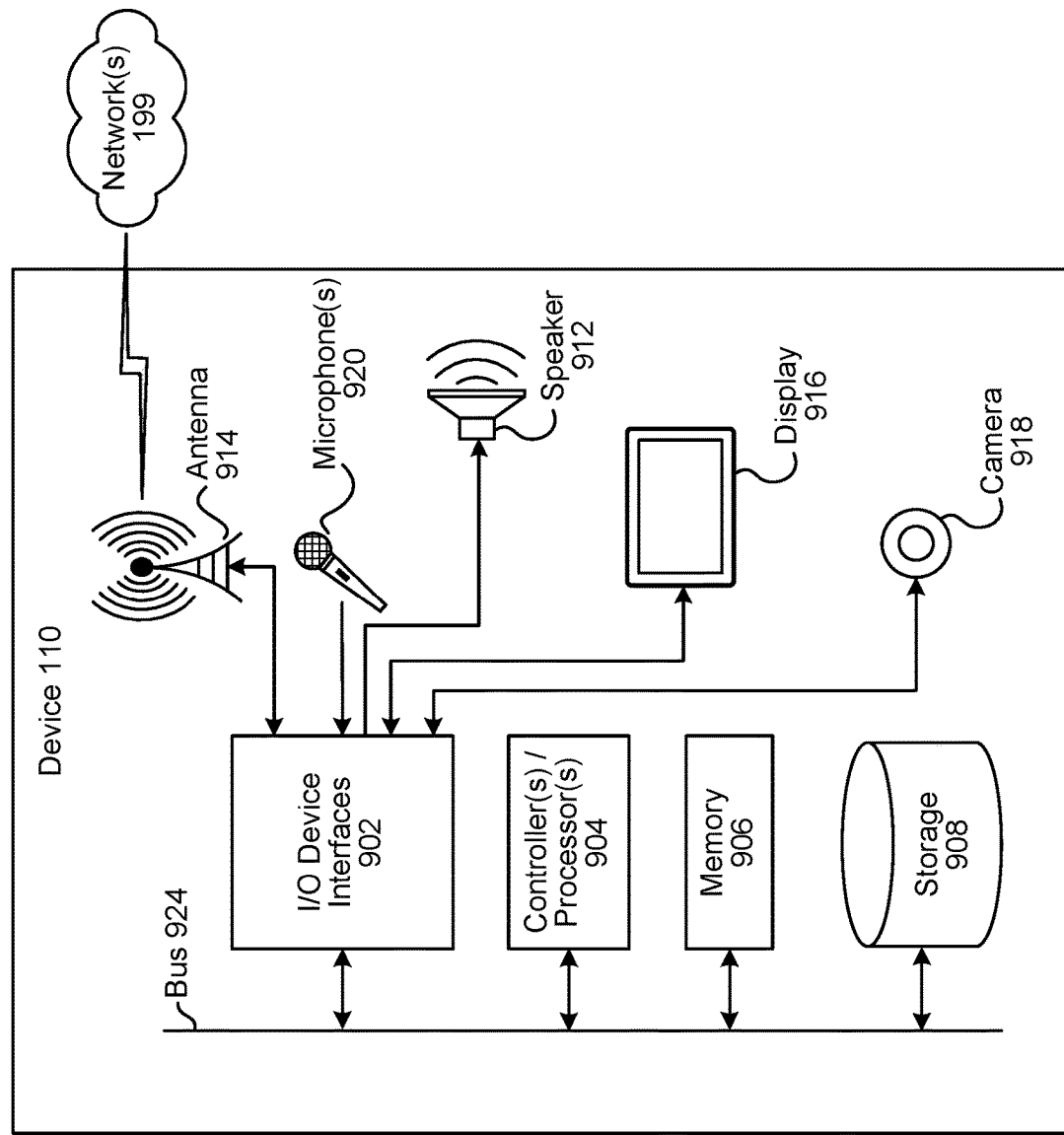
FIG. 9 is a block diagram conceptually illustrating example components of a device according to embodiments of the present disclosure.
Figure 10:
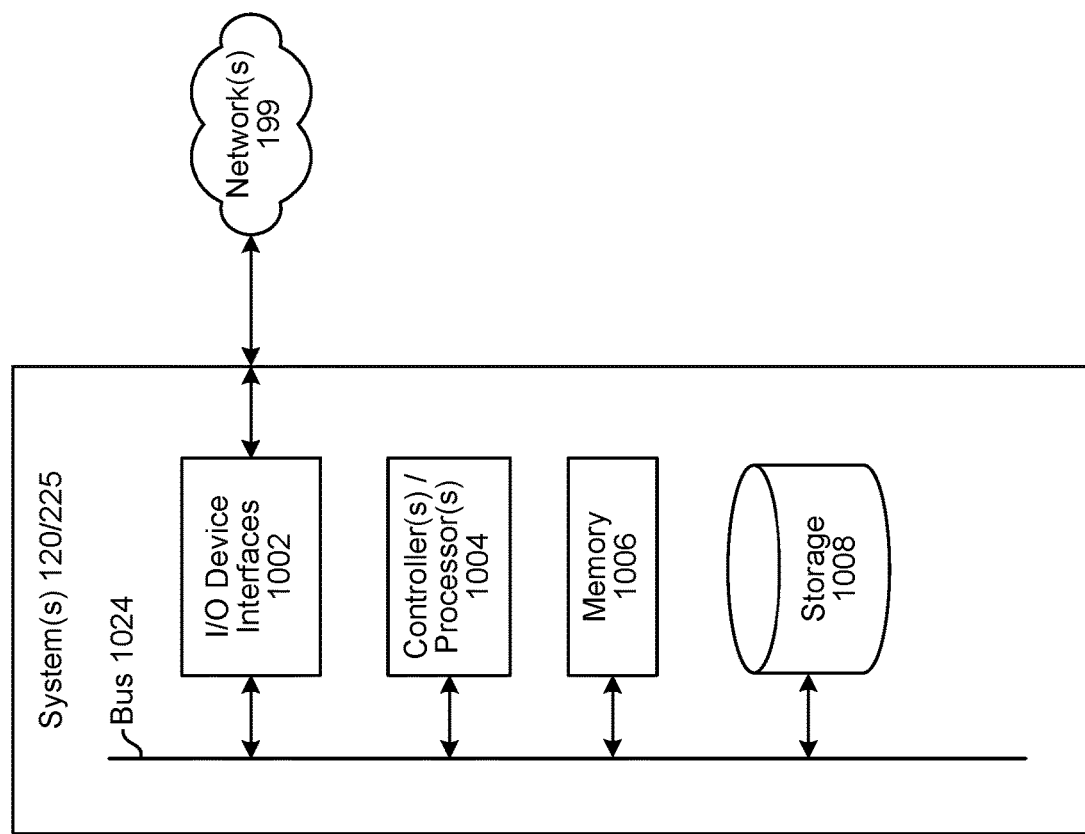
FIG. 10 is a block diagram conceptually illustrating example components of a system according to embodiments of the present disclosure.

FIG. 9 is a block diagram conceptually illustrating a device 110 that may be used with the system. FIG. 10 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (902/1002), processor(s) (904/1004), memory (906/1006), and/or storage (908/1008) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 11:
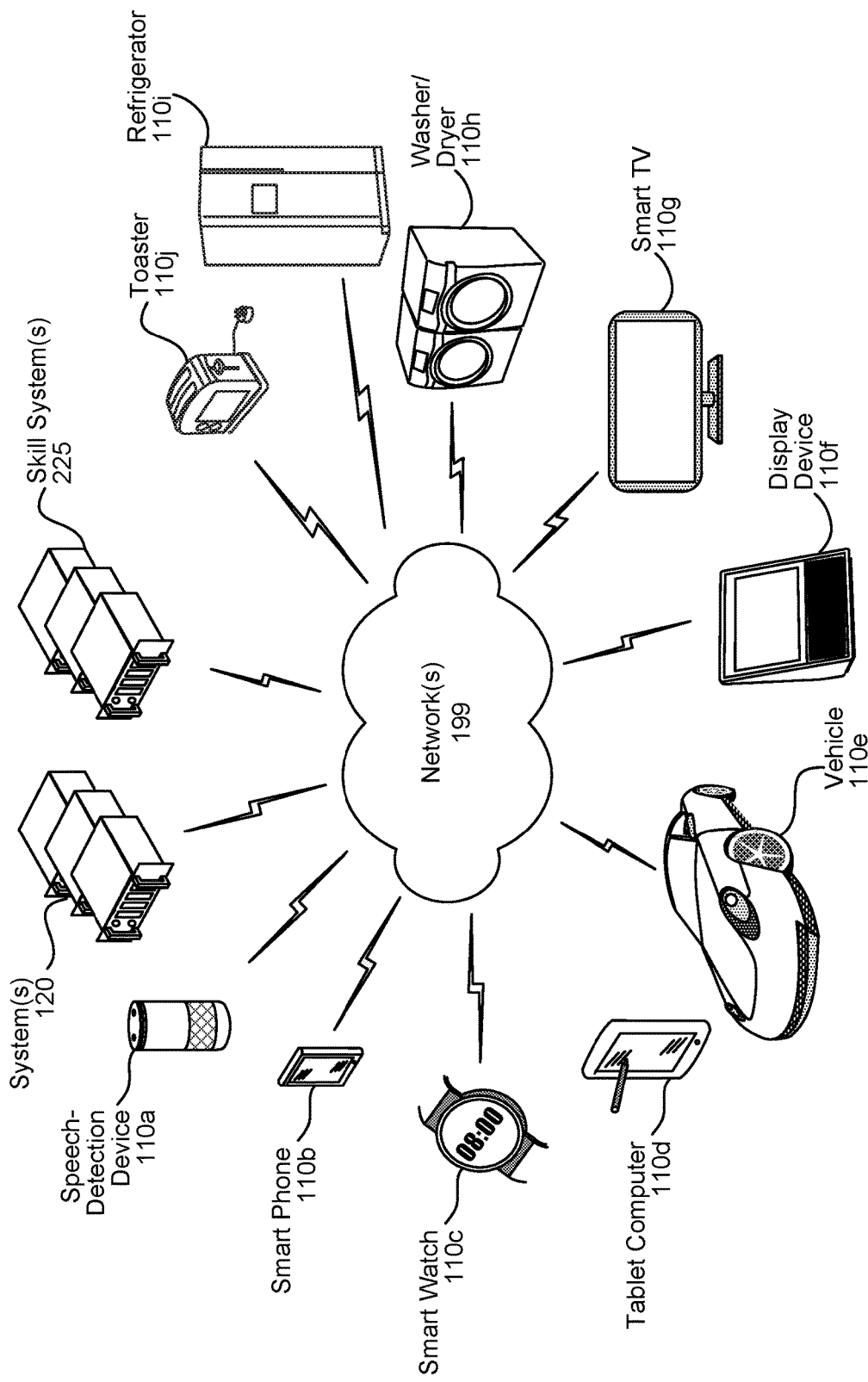
FIG. 11 illustrates an example of a computer network for use with the speech processing system.

As illustrated in FIG. 11, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a user device, first audio data representing a first utterance;
   performing automatic speech recognition (ASR) processing on the first audio data to generate first ASR output data representing the first utterance;
   determining first probability data indicating a first likelihood that a first system response to the first utterance results in an undesired response;
   determining, using a Markov Chain probabilistic graph, second ASR output data corresponding to a second utterance based on second probability data indicating a second likelihood that a second system response to the second utterance results in a desired response, the second utterance corresponding to a rephrasing of the first utterance;
   performing NLU processing on the second ASR output data, instead of the first ASR output data to determine a first intent representing the second utterance; and
   generating first output data based at least in part on the first intent.

2. The computer-implemented method of claim 1, further comprising:
   determining that the first ASR output data corresponds to a first node in the Markov Chain probabilistic graph;
   determining a path from the first node to a second node, the second node corresponding to the second ASR output data;
   determining a first score corresponding to the first node;
   determining a second score corresponding to the second node; and
   determining the second ASR output data based at least in part on the first score and the second score.

3. The computer-implemented method of claim 1, further comprising:
   receiving second audio data representing a third utterance;
   performing ASR processing on the second audio data to generate third ASR output data representing the third utterance;
   determining, using the Markov Chain probabilistic graph, that NLU processing of the third ASR output data will result in a correct system response to the third utterance;
   determining, using stored data corresponding to the Markov Chain probabilistic graph, a second intent corresponding to the third ASR output data; and
   generating second output data based at least in part on the second intent.

4. The computer-implemented method of claim 1, further comprising:
   receiving, at a first timestamp, second audio data representing the first utterance, the second audio data corresponding to a user profile;

performing ASR processing on the second audio data to determine third ASR output data corresponding to the first utterance;
performing NLU processing on the third ASR output data to determine an incorrect system response;
receiving, at a second timestamp, third audio data representing the second utterance, the third audio data corresponding to the user profile, the first timestamp and the second timestamp being within a predefined time window;
performing ASR processing on the third audio data to determine fourth ASR output data corresponding to the second utterance;
storing training data associating the third ASR output data and the fourth ASR output data; and
generating the Markov Chain probabilistic graph using the training data.

5. A computer-implemented method comprising:
receiving a first representation of a first natural language user input;
determining first probability data indicating a first likelihood that a first system response to the first natural language user input results in an undesired response;
determining, using a Markov Chain probabilistic graph, a second representation of a second natural language user input based on second probability data indicating a second likelihood that a second system response to the second natural language user input results in a desired response, the second natural language user input corresponding to a rephrasing of the first natural language user input;
processing the second representation to determine a first intent representing the second natural language user input; and
generating first output data based at least in part on the first intent.

6. The computer-implemented method of claim 5, further comprising:
determining, using stored data corresponding to the Markov Chain probabilistic graph, the first intent and an entity corresponding to the second natural language user input; and
generating the first output data further based at least in part on the entity.

7. The computer-implemented method of claim 5, further comprising:
receiving a third representation of a third natural language user input;
determining, using a trained model, that processing of the third representation will result in a correct system response to the third natural language user input;
determining, using stored data corresponding to the Markov Chain probabilistic graph, a second intent corresponding to the third representation; and
generating second output data based at least in part on the second intent.

8. The computer-implemented method of claim 5, further comprising:
determining, using a trained model, a first score associated with the first representation; and
determining the second representation based at least in part on the first score.

9. The computer-implemented method of claim 5, further comprising:
determining that the first representation corresponds to a first node in the Markov Chain probabilistic graph;
determining a path from the first node to a second node, the second node corresponding to the second representation;
determining a first score corresponding to the first node;
determining a second score corresponding to the second node; and
determining the second representation based at least in part on the first score and the second score.

10. The computer-implemented method of claim 5, further comprising:
receiving, from a user device, audio data representing the first natural language user input; and
performing automatic speech recognition (ASR) processing on the audio data to generate the first representation.

11. The computer-implemented method of claim 5, further comprising:
receiving, at a first timestamp, first input data representing the first natural language user input, the first input data corresponding to a user profile;
processing the first input data to determine an incorrect system response;
receiving, at a second timestamp, second input data representing the second natural language user input, the second input data corresponding to the user profile, the first timestamp and the second timestamp being within a predefined time window;
storing training data associating the first input data and the second input data; and
generating the Markov Chain probabilistic graph using the training data.

12. The computer-implemented method of claim 5, further comprising:
determining first dialog session data representing at least the second natural language user input, second NLU output data corresponding to the second natural language user input and including the first intent, and a first indicator for an output of NLU processing corresponding to the second natural language user input;
determining second dialog session data representing at least a third natural language user input, third NLU output data corresponding to the third natural language user input and including the first intent, and a second indicator for an output of NLU processing corresponding to the third natural language user input;
determining training data comprising at least the first dialog session data and the second dialog session data; and
generating the Markov Chain probabilistic graph using the training data.

13. A system, comprising:
at least one processor; and
at least one memory comprising instructions that, when executed by the at least one processor, cause the system to:
receive a first representation of a first natural language user input;
determine first probability data indicating a first likelihood that a first system response to the first natural language user input results in an undesired response;
determine, using a Markov Chain probabilistic graph, a second representation of a second natural language user input based on second probability data indicating a second likelihood that a second system response to the second natural language user input results in a desired response, the second natural language user input corresponding to a rephrasing of the first natural language user input;

process the second representation to determine a first intent representing the second natural language user input; and generate first output data based at least in part on the first intent.

14. The system of claim 13, wherein the at least one memory further comprises instructions that, when executed by the at least one processor, further cause the system to:

determine, using stored data corresponding to the Markov Chain probabilistic graph, the first intent and an entity corresponding to the second natural language user input; and generate the first output data further based at least in part on the entity.

15. The system of claim 13, wherein the at least one memory further comprises instructions that, when executed by the at least one processor, further cause the system to:

receive a third representation of a third natural language user input;

determine, using a trained model, that processing of the third representation will result in a correct system response to the third natural language user input;

determine, using stored data corresponding to the Markov Chain probabilistic graph, a second intent corresponding to the third representation; and generate second output data based at least in part on the second intent.

16. The system of claim 13, wherein the at least one memory further comprises instructions that, when executed by the at least one processor, further cause the system to:

determine, using a trained model, a first score associated with the first representation; and determine the second representation based at least in part on the first score.

17. The system of claim 13, wherein the at least one memory further comprises instructions that, when executed by the at least one processor, further cause the system to:

determine that the first representation corresponds to a first node in the Markov Chain probabilistic graph;

determine a path from the first node to a second node, the second node corresponding to the second representation;

determine a first score corresponding to the first node;

determine a second score corresponding to the second node; and determine the second representation based at least in part on the first score and the second score.

18. The system of claim 13, wherein the at least one memory further comprises instructions that, when executed by the at least one processor, further cause the system to:

receive, from a user device, audio data representing the first natural language user input; and perform automatic speech recognition (ASR) processing on the audio data to generate the first representation.

19. The system of claim 13, wherein the at least one memory further comprises instructions that, when executed by the at least one processor, further cause the system to:

receive, at a first timestamp, first input data representing the first natural language user input, the first input data corresponding to a user profile;

process the first input data to determine an incorrect system response;

receive, at a second timestamp, second input data representing the second natural language user input, the second input data corresponding to the user profile, the first timestamp and the second timestamp being within a predefined time window;

store training data associating the first input data and the second input data; and generate the Markov Chain probabilistic graph using the training data.

20. The system of claim 13, wherein the at least one memory further comprises instructions that, when executed by the at least one processor, further cause the system to:

determine first dialog session data representing at least the second natural language user input, second NLU output data corresponding to the second natural language user input and including the first intent, and a first indicator for an output of NLU processing corresponding to the second natural language user input;

determine second dialog session data representing at least a third natural language user input, third NLU output data corresponding to the third natural language user input and including the first intent, and a second indicator for an output of NLU processing corresponding to the third natural language user input;

determine training data comprising at least the first dialog session data and the second dialog session data; and generate the Markov Chain probabilistic graph using the training data.

* * * * *